United States Patent
Pittman

(10) Patent No.: US 9,032,633 B2
(45) Date of Patent: May 19, 2015

(54) METHOD AND APPARATUS FOR REPOSITIONING A TANDEM AXLE ASSEMBLY OF A TRAILER

(76) Inventor: Steven C. Pittman, Hendersonville, TN (US)

(*) Notice: Subject to any disclaimer, the term of this patent is extended or adjusted under 35 U.S.C. 154(b) by 667 days.

(21) Appl. No.: 13/351,198

(22) Filed: Jan. 16, 2012

(65) Prior Publication Data

US 2012/0255151 A1  Oct. 11, 2012

Related U.S. Application Data

(60) Provisional application No. 61/473,791, filed on Apr. 10, 2011.

(51) Int. Cl.
*B60D 1/36* (2006.01)

(52) U.S. Cl.
CPC .............. *B60D 1/36* (2013.01); *Y10T 29/49764* (2015.01)

(58) Field of Classification Search
CPC .............................. B60D 1/36; Y10T 29/49764
USPC .............................................. 33/264; 29/407.1
See application file for complete search history.

(56) References Cited

U.S. PATENT DOCUMENTS

| | | | |
|---|---|---|---|
| 3,363,318 A * | 1/1968 | Folkins et al. .................... 33/264 |
| 3,614,122 A | 10/1971 | Herron | |
| 4,042,049 A | 8/1977 | Reichow et al. | |
| 4,687,220 A * | 8/1987 | Danielson ....................... 280/477 |
| 4,789,033 A | 12/1988 | Dohrmann | |
| 5,036,593 A * | 8/1991 | Collier ............................ 33/264 |
| 5,232,234 A * | 8/1993 | McCombs .................... 280/80.1 |
| 5,326,144 A | 7/1994 | Forcier | |
| 5,486,807 A | 1/1996 | Price | |
| 5,617,072 A | 4/1997 | McNeal | |
| 5,678,834 A | 10/1997 | Wise | |
| 5,680,706 A * | 10/1997 | Talcott ............................ 33/286 |
| 5,711,245 A * | 1/1998 | Knirck ......................... 116/28 R |
| 5,969,594 A | 10/1999 | Gier et al. | |
| 6,062,160 A * | 5/2000 | Delcambre .................. 116/28 R |
| 6,222,457 B1 * | 4/2001 | Mills et al. .................. 340/686.1 |
| 6,354,642 B1 | 3/2002 | Haggerty | |
| 6,651,581 B2 * | 11/2003 | Gauthier ..................... 116/28 R |
| 6,827,363 B1 * | 12/2004 | Amerson ....................... 280/477 |
| 7,171,289 B1 | 1/2007 | Tamez et al. | |
| 7,404,466 B2 | 7/2008 | Diehl | |
| 7,415,771 B2 | 8/2008 | Harrill | |
| 7,416,233 B2 | 8/2008 | Hinson | |
| 7,896,373 B2 | 3/2011 | Beimert | |
| 2002/0100175 A1 * | 8/2002 | King ............................... 33/264 |
| 2002/0158756 A1 | 10/2002 | Martin | |
| 2003/0226493 A1 * | 12/2003 | Williams ..................... 116/28 R |
| 2008/0042818 A1 | 2/2008 | Kuentz et al. | |
| 2009/0184480 A1 | 7/2009 | Larsson et al. | |

* cited by examiner

*Primary Examiner* — Christopher Fulton
(74) *Attorney, Agent, or Firm* — Lyman H. Smith

(57) ABSTRACT

A portable device is used to aid a semi-truck driver in the repositioning of a tandem axle assembly of a trailer. The portable device may be easily attached and removed from the trailer's sub-frame during operation. The device will signal the driver visually when reaching the desired position during adjustment of the tandem axle assembly to a new location. The device may reduce time and increase safety for the driver during the tandem axle assembly repositioning operation. The device may be positioned at or near the desired tandem axle assembly position. A flap may pivotally hang in a position where a tire from the tandem axle assembly may deflect and pivot the flap when the tandem axle assembly reaches its desired position. A driver may see this flap deflection and know, with certainty, that they have achieved the desired tandem axle assembly position.

15 Claims, 3 Drawing Sheets

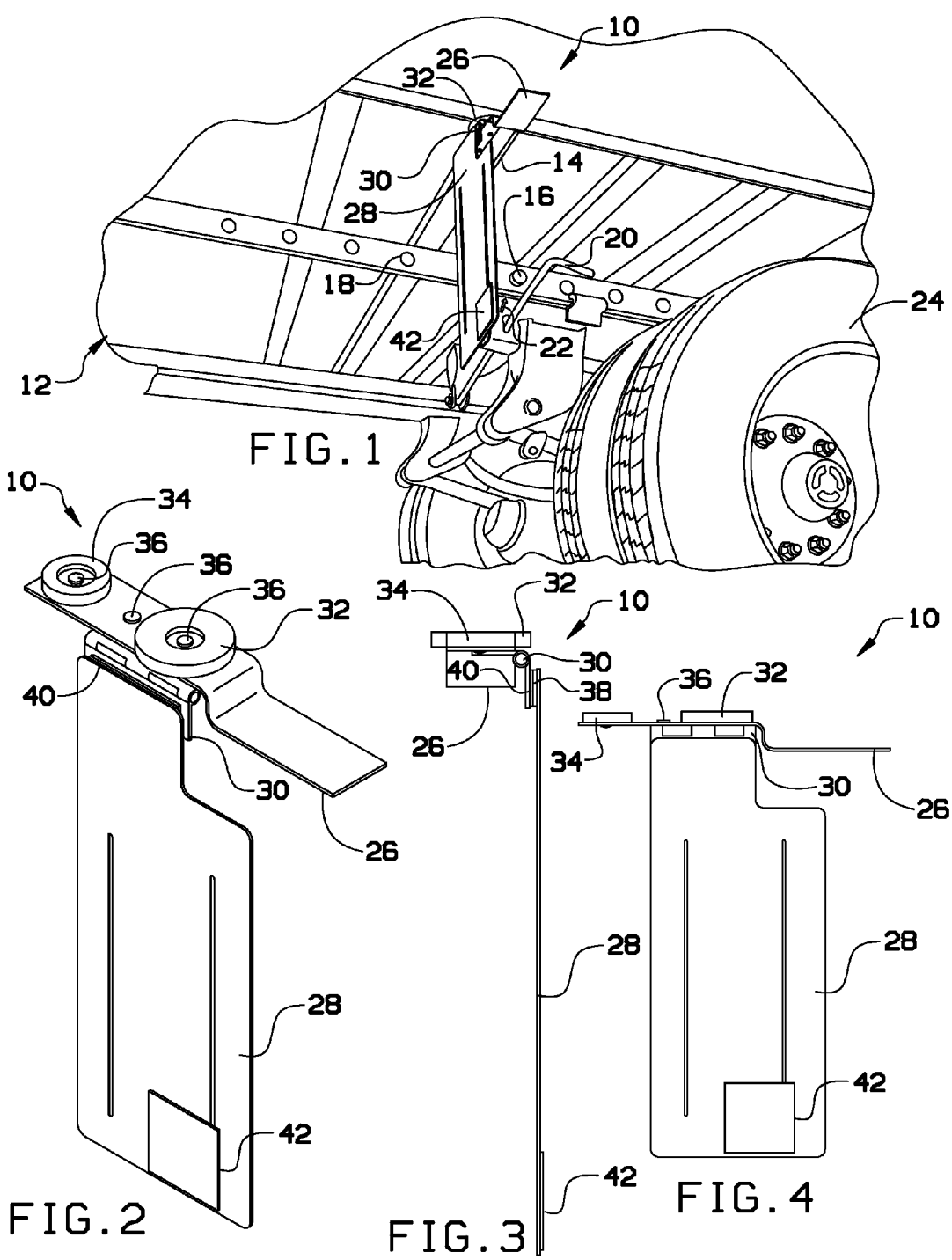

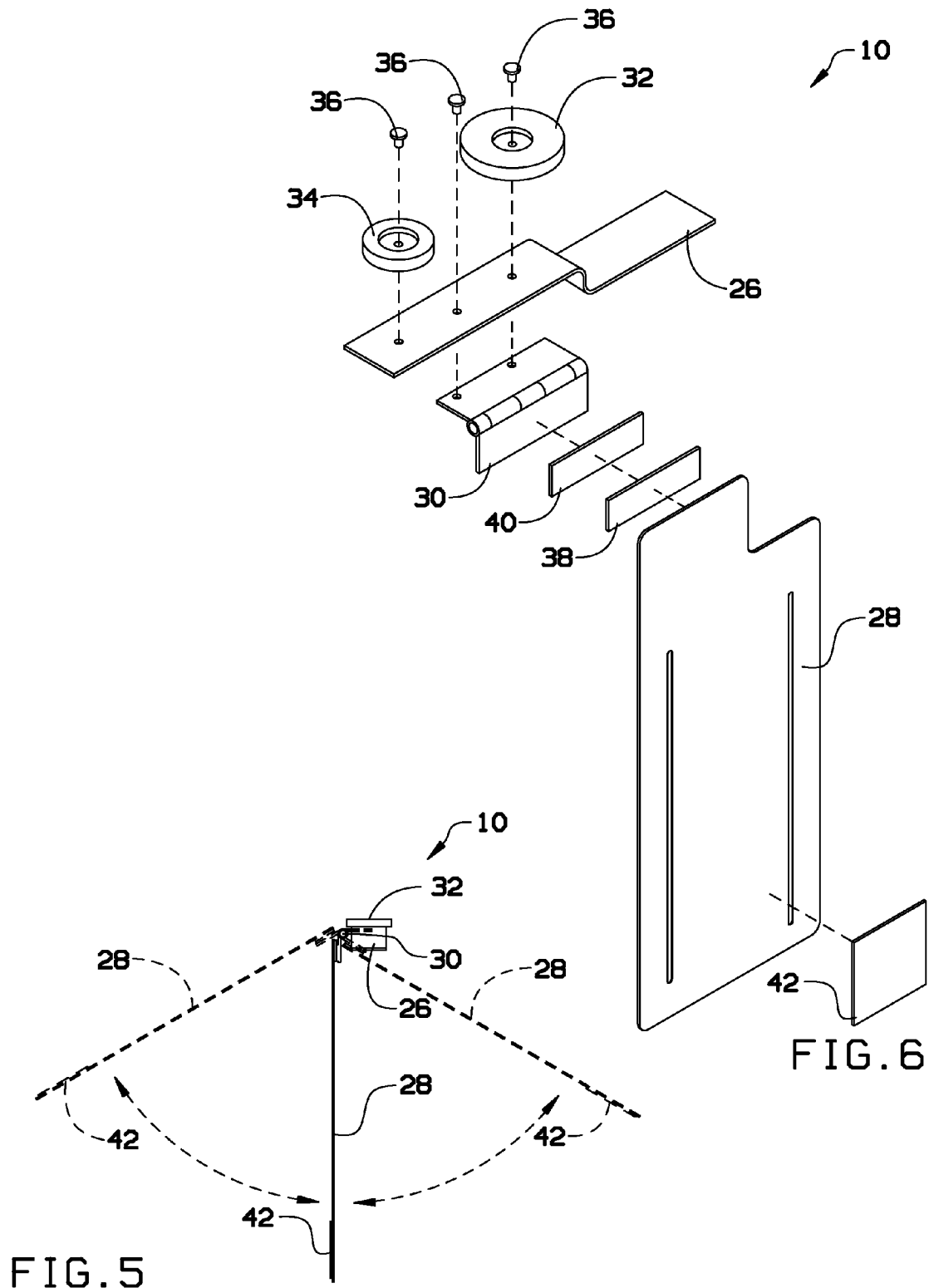

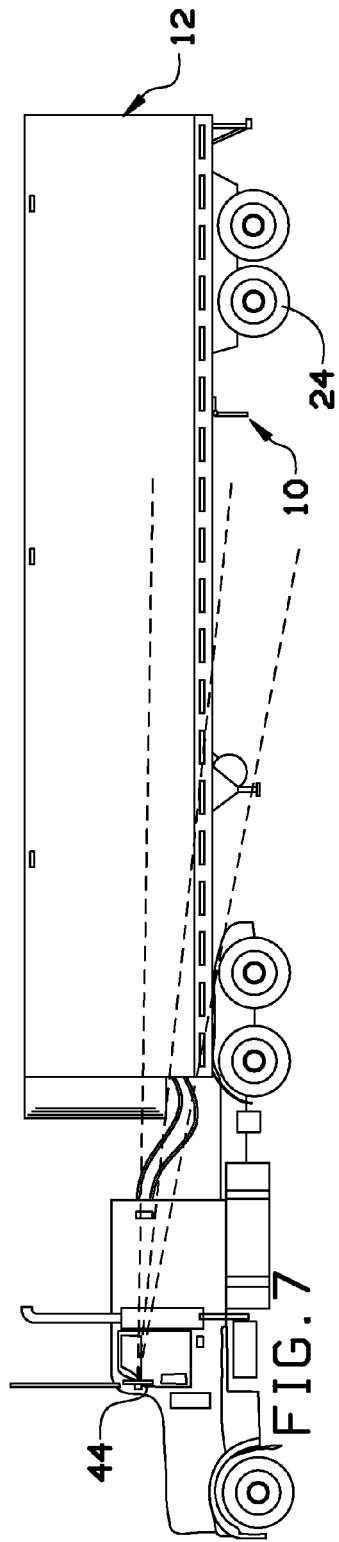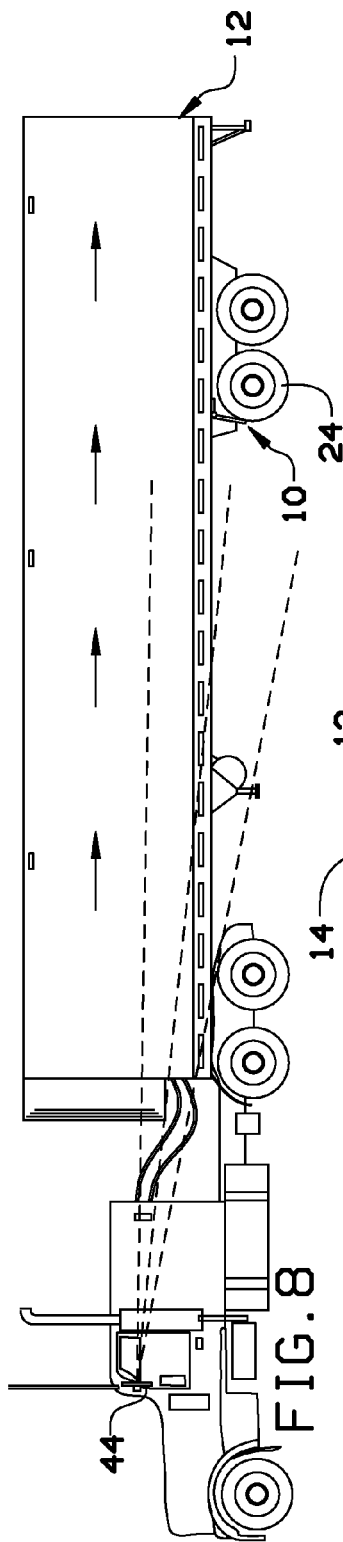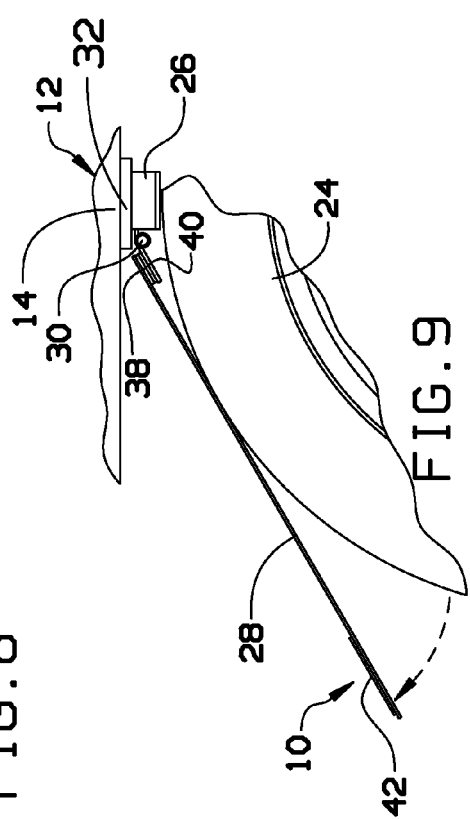

METHOD AND APPARATUS FOR REPOSITIONING A TANDEM AXLE ASSEMBLY OF A TRAILER

CROSS-REFERENCE TO RELATED APPLICATIONS

This application claims the benefit of priority to U.S. provisional patent application No. 61/473,791, filed Apr. 10, 2011, the contents of which are herein incorporated by reference.

BACKGROUND OF THE INVENTION

The present invention relates to trailer truck accessories and, more particularly, to a portable device, and a method of use thereof, used to aid a semi-truck driver in repositioning a tandem axle assembly of a trailer.

Many semi-trailers are equipped with longitudinally adjustable tandem axle assemblies, wherein the position of the tandem unit may be adjusted over some range in order to better distribute the load over the wheels, support the rear of the trailer during loading, or for some other reasons. These tandem units are normally secured in position to the trailer sub frame by a series of large, heavy spring loaded pins which project laterally through mating passages in the sub frame and tandem axle unit. A handle is used to release the pins for tandem adjustment.

In an ideal situation, a driver would have an assistant to help relocate the tandem axle assembly's position on the trailer sub frame. But, in most cases, the driver is required to make several trips in and out of the cab to check on the progress of the operation. The following steps are an example of the actions required for adjusting the tandem axle assembly. Step 1—Pull the tandem release handle in order to release the pins. Step 2—Return to the cab and move the trailer across the tandem axle assembly to the estimated desired position. Step 3—Leave the cab to check the position of the tandem assembly, release the unlocking force on the lock pin handle. Step 4—Return to the cab to move the trailer slightly to cause the pins to align with the locking holes of the tandem assembly in its new desired position. Step 5—Leave the cab to confirm that the tandem is locked in position. Step 6—Return to the cab for the drive. In addition to the above steps, it may be necessary for the driver to repeat steps 2 and 3 multiple times, if the desired location is not obtained.

If the driver has not moved the tractor and trailer sufficiently or has moved the trailer over the tandem axle assembly too far, the driver must return to the cab and attempt to position the tandem axle assembly at least close to the desired position so he can release the locking pin handle and rock the trailer to lock the locking pin into place to begin the trip. Since a driver is paid by the mile and not time, drivers who spend a substantial amount of time adjusting the location of the tandem axle assembly will decrease frustrations by using a visual aid to assist in the operation.

Most of the existing tandem axle assembly positioning aids are not light weight and cannot be quickly attached or removed from the trailer. Some devices even require multiple components to be attached to the trailer for proper use and others are permanently installed. In most cases, before these devices can be attached, the tandem axle assembly has to be positioned to the most aft location of the trailer.

As can be seen, there is a need for an improved tandem axle assembly positioning aid that is lightweight and can be quickly attached and removed from the trailer.

SUMMARY OF THE INVENTION

In one aspect of the present invention, a positioning tool for assisting in repositioning a tandem axle assembly on a trailer comprises a handle; one or more magnets disposed on one side, on one end of the handle; a hinge disposed opposite the one or more magnets; and a flap disposed on the hinge, where the flap is adapted to pivot on the hinge relative to the handle.

In another aspect of the present invention, a positioning tool for assisting in repositioning a tandem axle assembly on a trailer comprises a handle; first and second magnets disposed on one side, on one end of the handle; a hinge disposed opposite the one or more magnets; a flap removably disposed on the hinge, where the flap is adapted to pivot on the hinge relative to the handle; and a reflective material disposed at least on a portion of the flap.

In a further aspect of the present invention, a method for repositioning a tandem axle assembly of a trailer comprises determining wherein a forward-most locking pin is to be relocated to; temporarily affixing a positioning tool to a sub-frame of the trailer, the positioning tool comprising a handle; one or more magnets disposed on one side, on one end of the handle; a hinge disposed opposite the one or more magnets; and a flap disposed on the hinge, where the flap is adapted to pivot on the hinge relative to the handle; disengaging the locking pins of the tandem axle assembly; setting a tandem axle assembly brake; moving the tractor and trailer forward until the flap is in front of the tandem axle assembly; moving the trailer backward until the flap is pushed upward by a tire of the tandem axle assembly; releasing the locking pin handle; and locking the locking pins into locking pin holes.

These and other features, aspects and advantages of the present invention will become better understood with reference to the following drawings, description and claims.

BRIEF DESCRIPTION OF THE DRAWINGS

FIG. 1 is a perspective view of a positioning tool, in use, according to an exemplary embodiment of the present invention;

FIG. 2 is a perspective view of the positioning tool of FIG. 1;

FIG. 3 is a side view of the positioning tool of FIG. 1;

FIG. 4 is a front view of the positioning tool of FIG. 1;

FIG. 5 is a side view of the positioning tool of FIG. 1, showing movement of a flap on a hinge;

FIG. 6 is an exploded perspective view of the positioning tool of FIG. 1;

FIG. 7 is a side view of the positioning tool of FIG. 1, in use, prior to reaching a desired tandem axle assembly position;

FIG. 8 is a side view of the positioning tool of FIG. 1, in use, reaching a desired tandem axle assembly position; and FIG. 9 is a close up view showing the positioning tool of FIG. 1, in use, against a trailer tire, showing a desired tandem axle assembly position.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a portable device used to aid a semi-truck driver in the repositioning of a tandem axle assembly of a trailer. The portable device may be easily attached and removed from the trailer's sub-frame during operation. The device will signal the driver visually when reaching the desired position during adjustment of the tandem axle assembly to a new location. The device may reduce time and increase safety for the driver during the tandem axle assembly repositioning operation. The device may be positioned at or near the desired tandem axle assembly position. A flap may pivotally hang in a position where a tire from the tandem axle assembly may deflect and pivot the flap when the tandem axle assembly reaches its desired position. A driver may see this flap deflection and know, with certainty, that they have achieved the desired tandem axle assembly position. The device does not require the driver to adjust the current location of the tandem axle assembly prior to repositioning.

Referring now to FIG. 1, a semi-truck trailer 12 may include a tandem axle assembly 24 that may be positioned in various positions longitudinally along a trailer sub-frame 14. A locking pin 16 may fit into a locking pin hole 18 to lock the tandem axle assembly 24 into position. A locking pin handle 20 may be used to dislodge the locking pin 16 from the locking pin hole 18 to permit repositioning of the tandem axle assembly 24. The locking pin handle 20 may also be used to release the locking pin 16 into the locking pin hole 18. A mark 22 near the locking pin handle 20 may show where the locking pin 16 would align if the locking pin handle 20 is released. The mark 22 may be already present near the locking pin handle 20, or the driver may place the mark 22 there prior to releasing the locking pin 16 from the locking pin hole 18 during repositioning of the tandem axle assembly 24.

Referring now to FIGS. 2 through 6, a positioning tool 10 may include a handle 26 having a first magnet 32 and a second magnet 34 disposed on one side thereof. The handle 26 may be a flat, elongated rectangular-shaped handle, for example. In some embodiments, the handle 26 may include first and second parallel surfaces connected by a connection there between, as shown, for example, in FIG. 2. In other embodiments, the handle 26 may simply be a flat piece of material. In still other embodiments, the handle 26 may be a flat piece of material having a bend in a central portion thereof. The handle may be made in various sizes, shapes and of various materials, such as plastic, metal, such as aluminum, composite, or the like.

The first magnet 32 and the second magnet 34 may be attached to the handle 26 by conventional means, such as by adhesive, bolts, or, as shown in FIG. 2, by rivets 36. The first magnet 32 and second magnet 34 may be of the same or different sizes and shapes. For example, the magnets 32, 34 may both be round, and the first magnet 32 may be larger than the second magnet 34.

On a side opposite the magnets 32, 34, a hinge 30 may be attached to the handle 26. A flap 28 may be attached to the hinge 30. The hinge 30 may allow the flap 28 to pivot relative to the handle 26. In some embodiments, the hinge 30 may be a butt hinge. The hinge 30 may be made from materials known in the art, such as plastic, metal, composite, or the like.

The flap 28 may be attached to the hinge 30 by various manners. In some embodiments, the flap 28 may be attached to the hinge 30 by a hook and loop fastener, such as Velcro®. For example, a hook fastener may be applied to the flap 28, and a loop fastener 40 may be applied to the hinge 30. This configuration would allow the flap 28 to be disassembled from the hinge 30 and handle 26 for ease of storage. The flap 28 may be made of a rigid material, such as plastic, metal, composite, or the like. The flap 28 should be made of a rigid material so that a driver may see deflection of the flap when a repositioning operation is made, as described in greater detail below.

A reflecting material, such as reflection tape 42 may be applied to one or both sides of the flap 28. In some embodiments, the flap 28, itself, may include a reflective coating or may be manufactured from a reflective material. In other embodiments, only a portion of the flap 28 may include a reflective material. The reflection tape 42 may help the driver notice the initial deflection of the flap 28 when used in a tandem axle assembly repositioning operation.

Referring now to FIGS. 7 through 9, during tandem axle assembly repositioning, a driver may first position the positioning tool 10 in a desired location (typically where the forward most pin of the tandem axle assembly 24 should be relocated to) by applying the magnets 32, 34 to the sub-frame 14 of the semi-truck trailer 12 with the handle 26 extending beyond the plane of the side of the trailer 12. This step of positioning the positioning tool 10 may be accomplished without adjusting the original position of the tandem axle assembly prior to the attaching. When in position, the flap 28 should be visible in a rear-view mirror 44 in the cab of the truck.

The driver may then pull or lift the locking pin handle 20 to disengage the tandem locking pins 16 from the locking pin holes 18. The driver may place a mark 22 on the tandem axle assembly 24 to show a general location of the locking pins 16. This mark 22 may be optional, but may help in locating the locking pins 16 after sliding the trailer 12 to a desired location should the driver have to rock the trailer to lock the locking pins 16 in place in the desired locking pin holes 18.

The driver may then return to the cab, set the tandem axle brakes, and slowly move the tractor and trailer forward until the flap 28 is in front of the tandem axle assembly 24. Once positioned in front of the tandem axle assembly 24, with the tandem axle assembly brakes still set, the trailer is moved backward until the reflective flap 28 is pushed upward, as it makes contact with one of the tires of the tandem axle assembly 24. When the flap 28 reaches approximately a 10-40 degree angle, typically about a 20 degree angle, as viewed from the truck cab, the new location has been attained.

The driver should then return to the tandem axle assembly to check the position of the trailer and release the locking pin handle 20. During this final step, the driver should check the locking pin location by the mark 22 on the tandem axle assembly and return to the cab to move the trailer slightly forward or backwards to align/lock the locking pins 16 into the locking pin holes 18.

It should be understood, of course, that the foregoing relates to exemplary embodiments of the invention and that modifications may be made without departing from the spirit and scope of the invention as set forth in the following claims.

What is claimed is:

1. A positioning tool for assisting in repositioning a tandem axle assembly on a trailer, the positioning tool comprising:
   a handle having a longitudinal axis;
   one or more magnets disposed on one side, on one end of the handle along the longitudinal axis thereof;
   a hinge disposed opposite the one or more magnets, the hinge pivotable about a hinge axis, the hinge axis being substantially parallel to the longitudinal axis of the handle; and
   a flap disposed on the hinge, where the flap is adapted to pivot on the hinge relative to the handle.

2. The positioning tool of claim 1, further comprising two magnets disposed on the handle.

3. The positioning tool of claim 1, wherein the hinge is a butt hinge.

4. The positioning tool of claim 1, further comprising a reflective material disposed on at least one side of the flap.

5. The positioning tool of claim 4, wherein the reflective material is reflective tape.

6. The positioning tool of claim 5, wherein the reflective tape is disposed on a lower portion of the flap.

7. The positioning tool of claim 1, wherein the flap is removably attached to the hinge.

8. The positioning tool of claim 7, wherein a hook and loop fastener is used to removably attach the flap to the hinge.

9. The positioning tool of claim 1, wherein the handle includes two offset parallel surfaces, with the one or more magnets disposed on one of the two offset parallel surfaces.

10. A positioning tool for assisting in repositioning a tandem axle assembly on a trailer, the positioning tool comprising:
    a handle having a longitudinal axis;
    first and second magnets disposed on one side, on one end of the handle along the longitudinal axis thereof;
    a hinge disposed opposite the first and second magnets, the hinge pivotable about a hinge axis, the hinge axis being substantially parallel to the longitudinal axis of the handle;
    a flap removably disposed on the hinge, where the flap is adapted to pivot on the hinge relative to the handle; and
    a reflective material disposed at least on a portion of the flap.

11. A method for repositioning a tandem axle assembly of a trailer, the method comprising:
    determining wherein a forward-most locking pin is to be relocated to;
    temporarily affixing a positioning tool to a sub-frame of the trailer, the positioning tool comprising a handle having a longitudinal axis; one or more magnets disposed on one side, on one end of the handle along the longitudinal axis thereof; a hinge disposed opposite the one or more magnets, the hinge pivotable about a hinge axis, the hinge axis being substantially parallel to the longitudinal axis of the handle; and a flap disposed on the hinge, where the flap is adapted to pivot on the hinge relative to the handle;
    disengaging the locking pins of the tandem axle assembly;
    setting a tandem axle assembly brake;
    moving the tractor and trailer forward until the flap is in front of the tandem axle assembly;
    moving the trailer backward until the flap is pushed upward by a tire of the tandem axle assembly;
    releasing the locking pin handle; and
    locking the locking pins into locking pin holes.

12. The method of claim 11, further comprising placing a mark on the tandem axle assembly at a location of the locking pins.

13. The method of claim 11, wherein the positioning tool is applied to the sub-frame of the trailer without first repositioning the tandem axle assembly.

14. The method of claim 11, wherein the trailer is moved backward until the flap is pushed upward to about a 20 degree angle.

15. The method of claim 11, further comprising moving the trailer slightly forward or backward to lock the locking pins into the locking pin holes.

\* \* \* \* \*